US012251805B2

(12) United States Patent
Puppala et al.

(10) Patent No.: US 12,251,805 B2
(45) Date of Patent: Mar. 18, 2025

(54) FASTENER-DRIVING TOOL INCLUDING A REVERSION TRIGGER WITH A DAMPER

(71) Applicant: Illinois Tool Works Inc., Glenview, IL (US)

(72) Inventors: Madhav Sai Puppala, Glenview, IL (US); Stephen Moore, Palatine, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/507,810

(22) Filed: Nov. 13, 2023

(65) Prior Publication Data

US 2024/0075602 A1 Mar. 7, 2024

Related U.S. Application Data

(63) Continuation of application No. 17/677,662, filed on Feb. 22, 2022, now Pat. No. 11,839,961, which is a continuation of application No. 16/738,679, filed on Jan. 9, 2020, now Pat. No. 11,267,115, which is a continuation of application No. 15/583,334, filed on May 1, 2017, now Pat. No. 10,532,453, which is a continuation of application No. 14/109,671, filed on Dec. 17, 2013, now Pat. No. 9,662,776.

(51) Int. Cl.
*B25C 1/00* (2006.01)

(52) U.S. Cl.
CPC .................................... *B25C 1/008* (2013.01)

(58) Field of Classification Search
CPC ...................................................... B25C 1/008
See application file for complete search history.

(56) References Cited

U.S. PATENT DOCUMENTS 3,786,978 A 1/1974 Manganaro
3,964,659 A 6/1976 Eiben et al.
(Continued)

FOREIGN PATENT DOCUMENTS

EP 1223009 7/2002
EP 1240982 9/2002
(Continued)

OTHER PUBLICATIONS

Canadian Office Action for Canadian Application No. 2,928,576, dated Mar. 21, 2017 (4 pages).
(Continued)

*Primary Examiner* — Nathaniel C Chukwurah
(74) *Attorney, Agent, or Firm* — Neal, Gerber & Eisenberg LLP

(57) ABSTRACT

A fastener-driving tool is provided and includes a housing and a workpiece-contacting element movably connected to the housing, where the workpiece-contacting element is movable between a rest position and an activated position. A trigger is movably connected to the housing such that the trigger is movable between a rest position and an activated position. The tool further includes an actuation lever movably connected to the trigger and movable between a rest position and an activated position. A damper mechanism is associated with the actuation lever and is configured to control a rate of movement of the actuation lever between the activated position and the rest position.

18 Claims, 5 Drawing Sheets

(56) References Cited

U.S. PATENT DOCUMENTS

| | | | |
|---|---|---|---|
| 4,351,464 A | 9/1982 | Fehrs | |
| 4,679,719 A | 7/1987 | Kramer | |
| 5,191,861 A | 3/1993 | Kellerman | |
| 5,197,646 A | 3/1993 | Nikolich | |
| 5,522,532 A | 6/1996 | Chen | |
| 5,551,620 A | 9/1996 | Vallee | |
| 5,551,621 A | 9/1996 | Vallee | |
| 5,605,268 A | 2/1997 | Hayashi et al. | |
| 5,732,870 A | 3/1998 | Moorman et al. | |
| 5,772,096 A | 6/1998 | Osuka et al. | |
| 5,836,501 A | 11/1998 | Lai | |
| 5,862,969 A | 1/1999 | Lee | |
| 5,918,788 A | 7/1999 | Moorman et al. | |
| 6,213,372 B1 | 4/2001 | Chen | |
| 6,357,647 B1 | 3/2002 | Ou | |
| 6,371,348 B1 | 4/2002 | Canlas et al. | |
| 6,382,492 B1 | 5/2002 | Moorman et al. | |
| 6,431,425 B1 | 8/2002 | Moorman et al. | |
| 6,450,387 B1 | 9/2002 | Chen | |
| 6,543,664 B2 | 4/2003 | Wolfberg | |
| 6,604,664 B2 | 8/2003 | Robinson | |
| 6,691,907 B1 | 2/2004 | Chang | |
| 6,695,193 B1 | 2/2004 | Chang | |
| 6,695,194 B1 | 2/2004 | Chang | |
| 6,857,547 B1 | 2/2005 | Lee | |
| 7,070,080 B2 * | 7/2006 | Lin | B25C 1/008 227/8 |
| 7,143,918 B2 | 12/2006 | Aguirre et al. | |
| 7,163,134 B2 | 1/2007 | Moeller et al. | |
| 7,383,974 B2 | 6/2008 | Moeller | |
| 7,469,811 B2 | 12/2008 | Shima et al. | |
| 7,469,818 B2 | 12/2008 | Saltsor et al. | |
| 7,510,105 B2 | 3/2009 | Moeller et al. | |
| 7,513,402 B2 | 4/2009 | Miyashita | |
| 7,828,072 B2 | 11/2010 | Hashimoto et al. | |
| 7,938,305 B2 | 5/2011 | Simonelli et al. | |
| 7,971,766 B2 | 7/2011 | Tang | |
| 7,975,890 B2 | 7/2011 | Tang | |
| 8,011,441 B2 | 9/2011 | Leimbach et al. | |
| 8,011,547 B2 | 9/2011 | Leimbach et al. | |
| 8,313,012 B2 | 11/2012 | Shima et al. | |
| 8,336,749 B2 | 12/2012 | Largo | |
| 8,348,118 B2 | 1/2013 | Segura | |
| 9,061,407 B2 | 6/2015 | Chien et al. | |
| 9,242,359 B2 | 1/2016 | Staples | |
| 9,381,633 B2 | 7/2016 | Moore et al. | |
| 9,381,663 B2 | 7/2016 | Maurer | |
| 9,486,907 B2 | 11/2016 | Birk | |
| 9,550,288 B2 | 1/2017 | Moore et al. | |
| 9,662,776 B2 | 5/2017 | Puppala et al. | |
| 9,782,879 B2 | 10/2017 | Bauer | |
| 10,532,453 B2 | 1/2020 | Puppala | |
| 2002/0130154 A1 | 9/2002 | Wolfberg | |
| 2002/0185514 A1 | 12/2002 | Adams et al. | |
| 2005/0173484 A1 | 8/2005 | Moeller | |
| 2005/0173487 A1 | 8/2005 | Moeller et al. | |
| 2007/0131731 A1 | 6/2007 | Moeller | |
| 2009/0108046 A1 | 4/2009 | Huang | |
| 2009/0314818 A1 | 12/2009 | Segura | |
| 2010/0243699 A1 | 9/2010 | Largo | |
| 2010/0276467 A1 | 11/2010 | Kramer | |
| 2012/0097730 A1 | 4/2012 | Liang et al. | |
| 2012/0104070 A1 | 5/2012 | Wu et al. | |
| 2012/0298390 A1 | 11/2012 | Schieler | |

FOREIGN PATENT DOCUMENTS

| | | |
|---|---|---|
| EP | 2450152 | 9/2012 |
| JP | H08276375 | 10/1996 |
| WO | WO 02/051591 | 7/2002 |

OTHER PUBLICATIONS

International Search Report and Written Opinion for International Application No. PCT/US2014/064296, mailed Feb. 17, 2015 (9 pages).

* cited by examiner

FASTENER-DRIVING TOOL INCLUDING A REVERSION TRIGGER WITH A DAMPER

PRIORITY CLAIM

This patent application is a continuation of and claims priority to and the benefit of U.S. patent application Ser. No. 17/677,662, which was filed on Feb. 22, 2022, which is a continuation of and claims priority to and the benefit of U.S. patent application Ser. No. 16/738,679, which was filed on Jan. 9, 2020, now U.S. Pat. No. 11,267,115, which is a continuation of and claims priority to and the benefit of U.S. patent application Ser. No. 15/583,334, which was filed on May 1, 2017, now U.S. Pat. No. 10,532,453, which is a continuation of and claims priority to and the benefit of U.S. patent application Ser. No. 14/109,671, which was filed on Dec. 17, 2013, now U.S. Pat. No. 9,662,776, the entire contents of each of which are incorporated herein by reference.

BACKGROUND

The present disclosure relates generally to powered, fastener-driving tools, wherein the tools may be electrically powered, pneumatically powered, combustion powered, or powder activated, and more particularly to a new and improved fastener-driving tool having a trigger control mechanism that is capable of providing multiple actuation modes without the need to manually adjust the tool.

Powered, fastener-driving tools, of the type used to drive various fasteners, such as, for example, staples, nails, and the like, typically comprise a housing, a power source, a supply of fasteners, a trigger mechanism for initiating the actuation of the tool, and a workpiece-contacting element (also referred to herein as a "work contact element" or "WE"). The workpiece-contacting element is adapted to engage or contact a workpiece, and is operatively connected to the trigger mechanism, such that when the workpiece-contacting element is in fact disposed in contact with the workpiece, and depressed or moved inwardly a predetermined amount with respect to the tool, the trigger mechanism is enabled so as to initiate actuation of the fastener-driving tool.

As is well-known in the art, powered, fastener-driving tools normally have two types of operational modes, and the tool is accordingly provided with some mechanism, such as, for example, a lever, a latch, a switch, or the like, for enabling the operator to optionally select the one of the two types or kinds of operational modes that the operator desires to use for installing the fasteners. More particularly, in accordance with a first one of the two types or kinds of modes of operating the powered, fastener-driving tool, known in the industry and art as the sequential or single-actuation mode of operation, the depression or actuation of the trigger mechanism will not in fact initiate the actuation of the tool and the driving of a fastener into the workpiece unless the workpiece-contacting element is initially depressed against the workpiece. Considered from a different point of view or perspective, in order to operate the powered, fastener-driving tool in accordance with the sequential or single-actuation mode of operation, the workpiece-contacting element must first be depressed against the workpiece followed by the depression or actuation of the trigger mechanism. Still further, once the particular fastener has in fact been driven into the workpiece, further or repeated depression or actuation of the trigger mechanism will not result in the subsequent driving of additional fasteners into the workpiece unless, and until, the workpiece-contacting element is permitted to effectively be reset to its original position and once again disposed in contact with, and pressed against, the workpiece prior to the depression or actuation of the trigger mechanism each time the tool is to be actuated so as to drive a fastener into the workpiece.

Alternatively, in accordance with a second one of the two types or kinds of modes of operating the powered, fastener-driving tool, known in the industry and art as the contact actuation mode of operation, the operator can in fact maintain the trigger mechanism at its depressed position, and subsequently, each time the workpiece-contacting element is disposed in contact with, and pressed against, the workpiece, the tool will actuate, thereby driving a fastener into the workpiece.

Continuing further, trigger assemblies are known wherein mechanisms are provided upon, or incorporated within, the trigger assemblies of the fastener-driving tools for permitting the operator to optionally select one of the two types of operating for the powered, fastener-driving tool that the operator desires to implement in order to drive fasteners into the workpiece in a predetermined manner so as to achieve predetermined fastening procedures. One such trigger assembly is disclosed, for example, within U.S. Pat. No. 6,543,664 to Wolf berg. The trigger assembly in Wolf berg includes a trigger that is manually movable between a first position, in which the tool is in a sequential actuation mode, and a second position, in which the tool is in a contact actuation mode.

Experienced carpenters typically use a sequentially actuated tool for precision nailing and a contact actuated tool for non-precision nailing, such as roofing and decking. A need therefore exists for a fastener-driving tool that is readily, quickly and easily manipulated to be alternately operable between a contact actuation mode and a sequential actuation mode.

SUMMARY

Various embodiments of present disclosure provide a new and improved fastener-driving tool which has a trigger control mechanism for alternatively permitting contact actuation and sequential actuation modes of operation without manual adjustment of the tool.

In an embodiment, a fastener-driving tool is provided and includes a housing and a workpiece-contacting element movably connected to the housing, where the workpiece-contacting element is movable between a rest position and an activated position. A trigger is movably connected to the housing such that the trigger is movable between a rest position and an activated position. The tool further includes an actuation lever movably connected to the trigger where the actuation lever is movable between a rest position and an activated position. A damper mechanism is associated with the actuation lever and is configured to control a rate of movement of the actuation lever between the activated position and the rest position.

In another embodiment, a fastener-driving tool is provided and includes a housing, a workpiece-contacting element movably connected to the housing, the workpiece-contacting element being movable between a rest position and an activated position and a trigger movably connected to the housing, the trigger being movable between a rest position and an activated position. The tool further includes an actuation lever movably connected to the trigger, a damper mechanism associated with the actuation lever and configured to control a rate of movement of the damper mechanism and a control valve including an actuating pin where the actuating pin is movable between a rest position and an activated position. In a contact actuation mode, the trigger is in the activated position and the damper mechanism controls the rate of movement of the actuation lever so that the actuation lever moves from a position adjacent to the actuating pin to a rest position in a pre-determined period of time, where the tool is actuated each time the workpiece-contacting element contacts a workpiece and moves to the activated position causing the actuating pin to move to the activated position until the actuation lever is in the rest position when the pre-determined period of time has lapsed.

DETAILED DESCRIPTION

Figure 1:
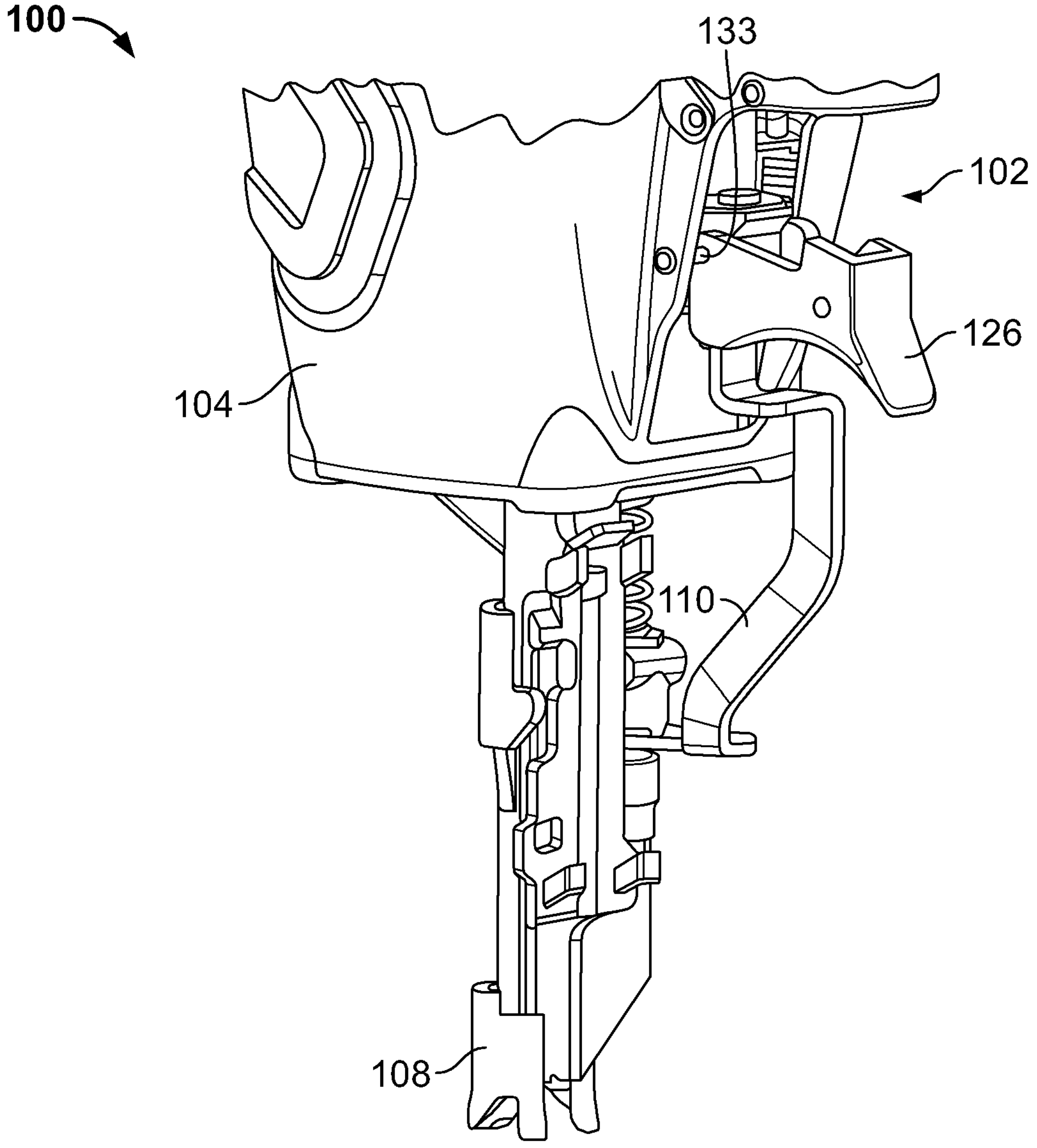
FIG. 1 is a fragmentary perspective view of a fastener-driving tool of the present disclosure.

Referring now to FIGS. 1-8, the fastener-driving tool 100 includes a trigger control mechanism or trigger assembly generally indicated by the reference number 102. More particularly, it is seen that the illustrated trigger control mechanism 102 is adapted to be mounted upon the fastener-driving tool 100 which comprises a fastener-driving tool housing 104. A workpiece-contacting element assembly 106, which comprises a lower workpiece-contacting element 108 and is adapted to be disposed on contact with a workpiece, and an upper workpiece-contacting element linkage member 110 is slidably mounted in a reciprocal manner upon the tool housing 104.

A control valve mechanism or control valve assembly 112 (FIGS. 6-8) is mounted upon the tool housing 104 so as to initiate either a sequential or contact actuation mode of operation of the fastener-driving tool 100 when the control valve mechanism 112 is actuated by the trigger control mechanism 110 as will be described below. More particularly, the control valve mechanism 112 includes a valve member 114 having a valve stem or actuating pin 116 biased by a spring 118 and configured to be seated upon a valve seat 120. The valve stem 116 is positioned to be engaged by an actuation lever 122 of the trigger control mechanism 110. The actuation lever 122 is movable between a first position or a rest position shown in FIG. 6, and a second position or an activated position shown in FIG. 7, and includes a return spring 124, such as a torsion spring shown in FIGS. 6-8, mounted on post 125 extending from the housing 104, where the return spring 124 biases the actuation lever 122 to the rest position. It should be appreciated that return spring 124 may be a coil spring, a leaf spring or any suitable spring and may also be a coil spring, a torsion spring or other suitable spring located on the actuating pin 116 or on the actuation lever.

Figure 2:
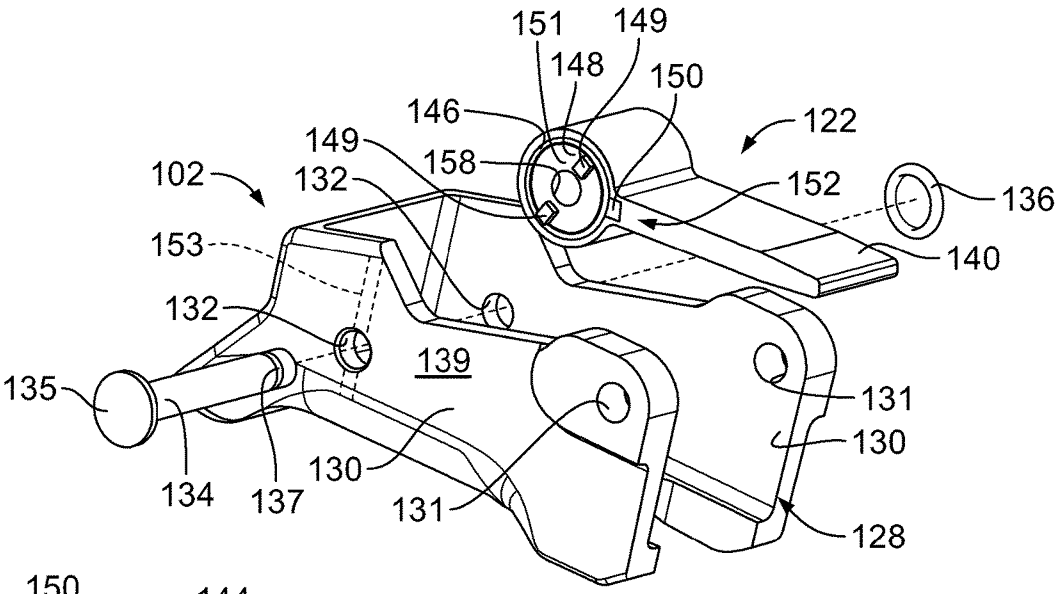
FIG. 2 is an enlarged, exploded perspective view of a trigger control mechanism of the present disclosure.

Referring now to FIGS. 1-5, the trigger control mechanism 102 includes a trigger member or trigger 126 which comprises a hollow housing structure 128 having a pair of oppositely disposed side walls 130 to accommodate the actuation lever 122 between the side walls. More specifically, the pair of oppositely disposed side walls 130 of the trigger 126 define first through-holes 131 configured to receive a pivot pin 133 (FIG. 1) for pivotably mounting the trigger 126 to the tool housing 104 and second through-holes 132 configured to accommodate a pivot pin 134 inserted through the second through-holes for pivotably mounting the actuation lever 122 within the trigger 126. As shown in FIG. 2, the pivot pin 134 includes a head 135 on one end and a groove 137 on an opposing end such that the pivot pin is inserted through the aligned second through-holes 132 until the head contacts an outer surface 139 of the side wall 130. At least one o-ring 136 made of rubber or another suitable material is mounted in the groove on the pivot pin 134 outside of the side wall 130 of the trigger 126 to secure the pivot pin to the housing structure 128 of the trigger.

Figure 5:
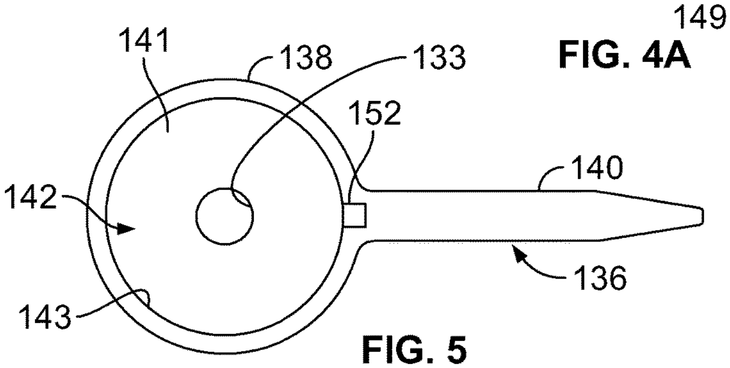
FIG. 5 is an elevational view of a side of the actuation lever of FIG. 3 with the damper mechanism removed.

As shown in FIGS. 2 and 5, the actuation lever 122 includes a housing 136 having a cylindrical portion 138 with a closed end 141 and an open end 143, and an elongated lever 140 extending from the cylindrical portion. The cylindrical portion 138 of the actuation lever 122 defines an inner generally cylindrical chamber 142 configured to receive a damper mechanism or damper 144 for controlling the rate of movement of the actuation lever 122 relative to the trigger 126.

Figure 3:
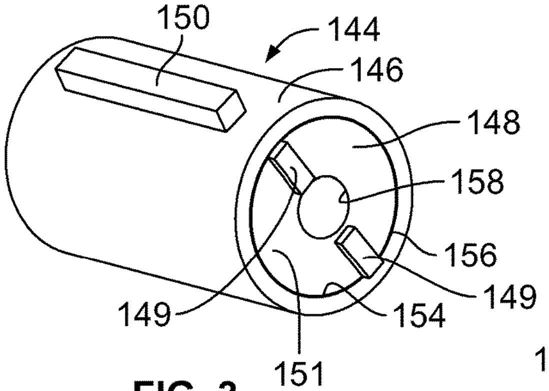
FIG. 3 is a perspective view of a damper mechanism associated with the actuation lever of the trigger control mechanism of FIG. 2.
Figure 4A:
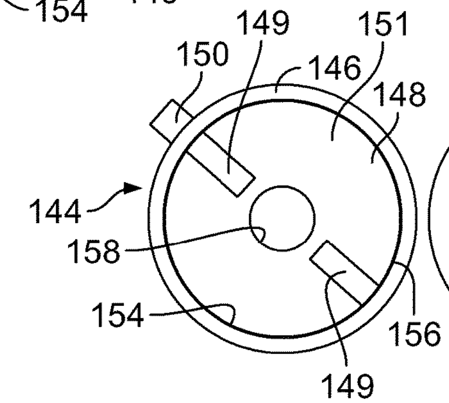
FIG. 4A is an elevational view of a first side of the damper mechanism of FIG. 3.
Figure 4B:
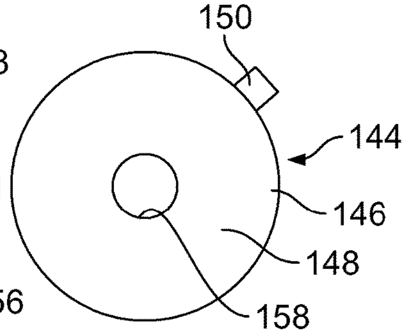
FIG. 4B is an elevational view of a second, opposing side of the damper mechanism of FIG. 3.

As specifically shown in FIGS. 3-5, an example of the damper mechanism 144 is shown and includes an outer member 146 and an inner member 148. The outer member 146 is made of plastic and includes a closed end having a central through-hole 133, an opposing, open end and an elongated protruding tab 150 that extends from an outer surface of the outer member and is configured to engage a groove 152 defined by the actuation lever housing 136. The mating engagement of the tab 150 and the groove 152 helps to secure the outer member 146 in position relative to the actuation lever 122 such that the outer member moves or rotates in unison with the actuation lever housing 136. Similarly, the inner member 148 is made of plastic and has a generally cylindrical shape. At least one and preferably a pair of protruding prongs 149 extend from an end cap 151 of the inner member and are configured to engage a slot-like groove 153 formed on an inner surface of the trigger 126 to hold or fix the inner member 148 in position on the trigger such that the outer member 146 and actuation lever housing 136 rotate relative to the inner member. As shown in FIG. 3, the end cap 151 covers an end of the inner member 148 and forms a seal with the outer member 146.

To control the rate of movement or rotation of the inner member 148 relative to the outer member 146, the damper mechanism 144 is constructed so that the diameter of the inner member is less than the inner diameter of the outer member to form an annular space 154 between the inner and outer members. A damping fluid 156, such as a silicone fluid, is injected or inserted into the annular space 154 between the inner and outer members 146, 148 and controls the rate of movement of the outer member relative to the inner member based on the viscosity of the fluid. For example, damping fluids having a high viscosity inhibit the movement of the outer member 146 relative to the inner member 148 more than fluids having a low viscosity. It should also be appreciated that the rate of movement or rotation of the actuation lever may be controlled by the type of return spring that is associated with the actuation lever, and the spring rate or size of the return spring. As stated above, there is a seal formed between the end cap 151 of the inner member 148 and the outer member 146 such that the seal helps to prevent the damping fluid 156 from leaking out of the annular space 154.

As shown in FIGS. 2, 3 and 4A, the inner member 148 defines a through-hole 158 configured to receive the pivot pin 134 such that the through-holes 132 of the side walls 130 of the trigger 126 are aligned with the through-hole 158 of the inner member 148 and the central through-hole 133 in the actuation lever housing 136 such that the pivot pin 134 is inserted through the aligned through-holes to secure the actuation lever 122 to the trigger 126. Also, the protrusions or prongs 149 on the inner member 148 are inserted in the slot-like groove 153 on the inner surface of the trigger 126 to fix the inner member in position on the trigger.

As described above, the damper mechanism 144 controls the rate of movement or rate of rotation of the outer member 146, and thereby the actuation lever housing 136, relative to the trigger 126. Since the actuation lever 122 is in the contact actuation mode while it is moving between the actuating pin 116 and the rest position, the time that the tool 100 is in the actuation mode is determined by the rate of movement or rotation of the actuation lever 122 and thereby by the damper mechanism 144 and the return spring 124. It should be appreciated that the rate of movement of the actuation lever 122 may be controlled by the type or size of the damper mechanism 144 associated with the actuation lever 122 or the type or size of the return spring 124 that biases the actuation lever to the rest position. It should also be appreciated that the damper mechanism 144 is one example of a damper mechanism or damper that may be used in the fastener-driving tool 100 of the present disclosure and it is contemplated that other suitable damping mechanisms may be used including but not limited to fluid dampers, pneumatic dampers, friction dampers or any suitable damper mechanisms.

Having described the various structural components comprising the new and improved trigger control mechanism 102, a brief description of the operation of the trigger control mechanism in both the sequential actuation and contact actuation modes of operation will now be described with reference to FIGS. 6-8.

Figure 6:
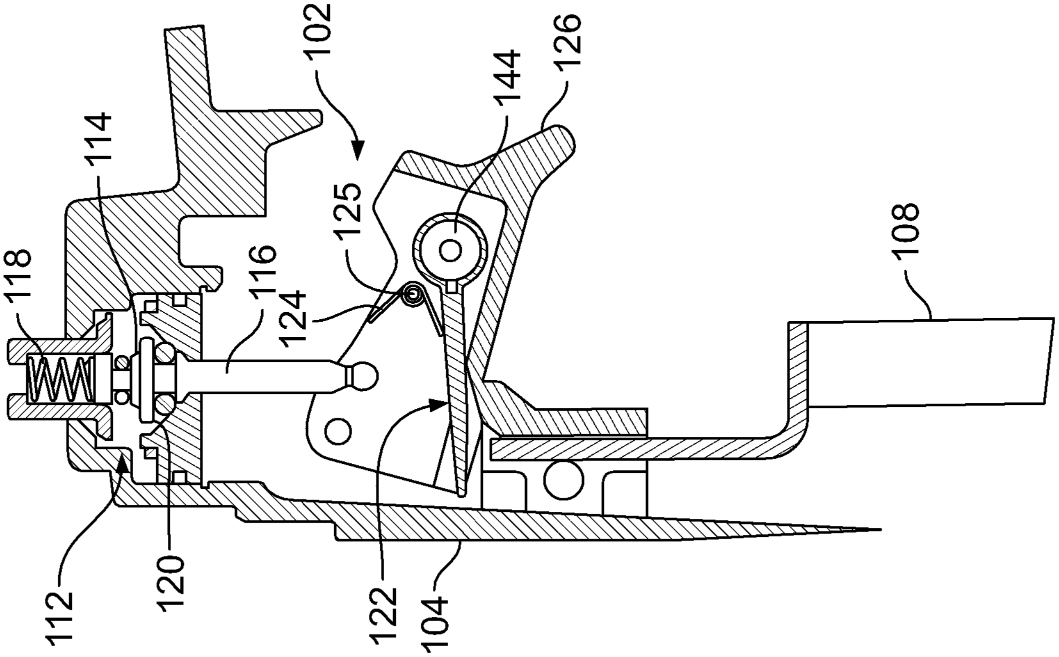
FIG. 6 is a cross-sectional view of the conventional, trigger control mechanism for the fastener-driving tool of FIGS. 1 and 2, wherein, the actuation lever is positioned upon the trigger assembly at its rest position, the workpiece-contacting element has not as yet been depressed against a workpiece, and the finger contact portion of the trigger has not as yet been pressed inwardly to activate the trigger.
Figure 7:
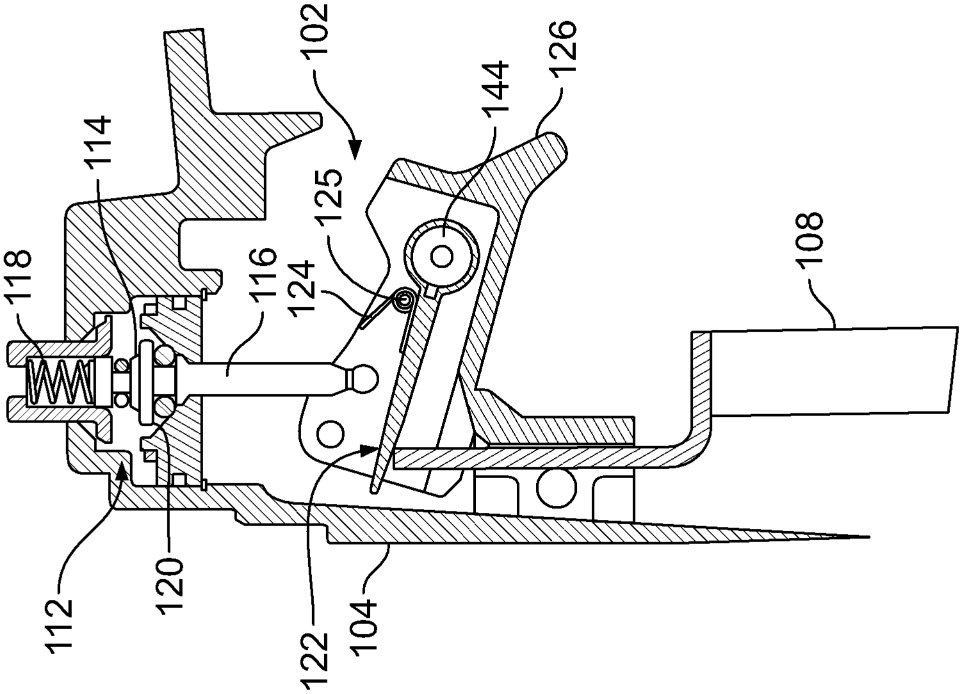
FIG. 7 is a cross-sectional view of the trigger control mechanism of FIG. 6, wherein the actuation lever is in the sequential actuation mode, the workpiece-contacting element has been depressed against the workpiece, but the finger contact portion of the trigger has not yet been pressed inwardly to activate the trigger.

In the sequential actuation mode, the trigger 126 and the workpiece-contacting element or WE 108 is initially in the rest or non-activated positions as shown in FIG. 6. To initiate sequential actuation of the tool 100, the workpiece-contacting element 108 contacts or is pressed against a workpiece so that the workpiece-contacting element moves upwardly and contacts the actuation lever 122 causing the actuation lever to move away from the bottom of the trigger (FIG. 7). To actuate the tool 100 and drive a fastener (not shown) into a workpiece, the trigger 126 is pressed or moved upwardly or toward the tool housing to the activated position shown by the top actuation lever position 160 in dashed lines in FIG. 8 where the actuation lever 122 contacts and engages the valve stem or actuating pin 116. The workpiece-contacting element 108, the actuation lever 122 and the trigger 126 are now in the activated positions to actuate the tool 100 and drive a fastener into the workpiece. Releasing the trigger 126 causes the return spring 124 to bias the actuation lever 122 to the rest or non-activated position shown in FIG. 6. The above process is then repeated to actuate the tool 100 and drive another fastener into the workpiece.

Figure 8:
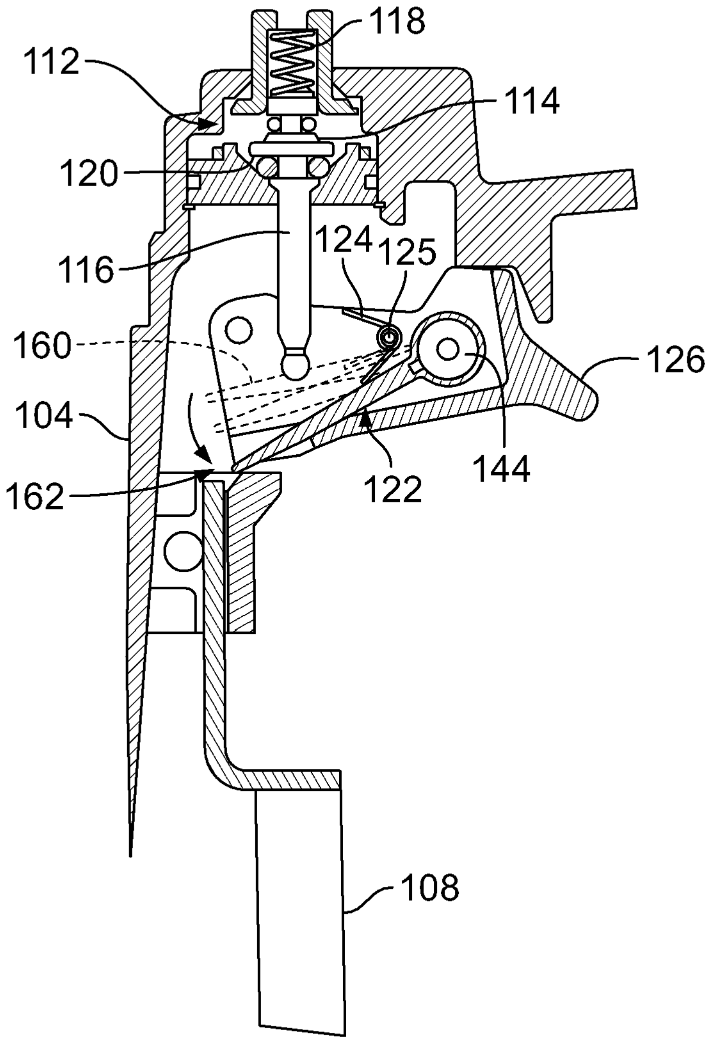
FIG. 8 is a cross-sectional view of the trigger control mechanism of FIG. 6, wherein the actuation lever is in the contact actuation mode and the trigger is held inwardly to maintain activation of the trigger so that an actuation of the tool occurs each time the workpiece-contacting element is depressed against the workpiece.

Referring now to FIG. 8, the tool 100 is in the contact actuation mode for a predetermined or designated period of time by utilizing the damper mechanism 144 as described above. Specifically, after sequential actuation of the tool 100, a user may initiate the contact actuation mode by holding the trigger 126 in the activated position after a sequential or single actuation of the tool. For example, when the tool 100 is released or lifted away from a workpiece, the workpiece-contacting element 108 moves downwardly or away from the actuation lever 122 and trigger 126. The workpiece-contacting element 108 is not pressing upwardly against the bottom side of the actuation lever 122, and thereby releases the actuation lever and enables the return spring 124 to bias the actuation lever 122 toward the rest position. As stated above, the damper mechanism 144 controls the rate of movement or rate of rotation of the actuation lever 122 from a point adjacent to the actuating pin 116 (top actuation lever position 160 shown in dashed lines in FIG. 8) to the point against the bottom surface of the trigger 126, i.e., the rest position (bottom actuation lever position 162 shown in solid lines in FIG. 8). As described above, the rate of movement or rate of rotation of the actuation lever 122 is based on a combination of the return spring 124 and the damper mechanism 144, and more specifically, on the type, size and force rate of the return spring and the type and size of the damping mechanism. In the contact actuation mode, the user is able to actuate the tool 100 each time that the workpiece-contacting element 108 is pressed against the workpiece until the actuation lever 122 is in the rest position. It should be appreciated that the rate of movement or rate of rotation of the actuation lever 122 may be any suitable rate of movement or rotation. Once the actuation lever 122 reaches the rest position, the user must repeat the sequential actuation sequence described above to drive another fastener into the workpiece or to re-initiate the contact actuation mode. Thus, the tool 100 reverts back to the sequential operation mode if the trigger 126 remains in the activated position but the tool 100 is not actuated after the designated period of time, i.e., the period of time for movement of the actuation lever 122 from the actuating pin 116 to the rest position. Alternatively, if the trigger 126 is released, the above sequential actuation sequence must be repeated to drive another fastener into a workpiece.

Figure 9:
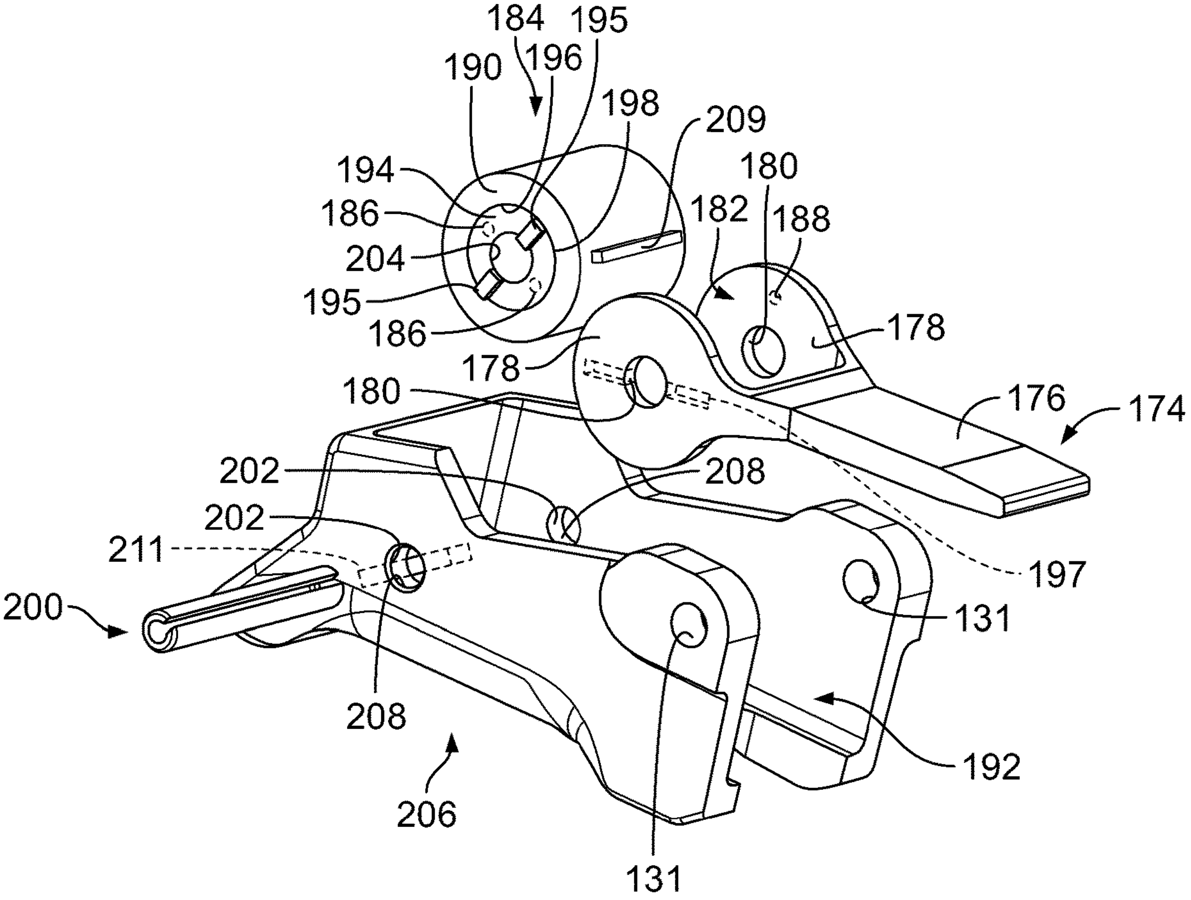
FIG. 9 is an enlarged, exploded perspective view of another embodiment of the trigger control mechanism of the present disclosure.

Referring now to FIG. 9, another embodiment of the actuation lever is shown where actuation lever 174 includes an elongated lever 176 and a pair of generally cylindrical arms 178 extending from an end of the lever. Each of the arms 178 includes a through-hole 180 and an inner space 182 for receiving a damper mechanism 184. In the illustrated embodiment, an end of the damper mechanism 184 and more specifically, inner member 194 includes at least one protrusion 186 that engages at least one corresponding recess 188 on an inner surface 190 of one of the arms 178. The engagement of the protrusions 186 in the recesses 188 secures the inner member member 194 to the actuation lever 174 such that the inner member rotates in unison with actuation lever housing 192. Alternatively, the inner member 194 may have protruding prongs or tabs 195 that engage a slot-like groove 197 defined by an inner surface of one of the arms 178. Similarly, the outer member 190 is secured to or fixed in position relative to the trigger 208 by a protruding tab 209 on the outer member 190 that engages a corresponding groove 211 defined on an inner surface of the trigger 208.

As described above, the inner member 194 has an outer diameter that is less than an inner diameter of an outer member 190 to define an annular space 196 therebetween. A damping fluid 198 is inserted or injected into the annular space 196 to control the rate of movement or rate of rotation of the inner member 194 relative to the outer member 190. A pivot pin 200 having a generally C-shaped cross section is inserted through aligned through-holes 202, 180 and 204 respectively trigger 206, the actuation lever housing 192 and the damper mechanism 184 for securing the actuation lever to the trigger. The C-shaped cross section of the pivot pin 200 allows the pivot pin to be compressed for squeezing the pivot pin into the through holes 202, 180 and 204 of the trigger, actuation lever housing and the damper. After insertion, the pivot pin 200 expands and presses against inner surfaces 208 of the housing to fixedly secure the inner member 194 to the pivot pin 200 and the trigger. It should be appreciated that the pivot pin 200 may have any suitable size or shape and generally has a diameter that is greater than the diameter of the through-holes 202 in the trigger 206 and to form a friction fit with the trigger. Other suitable pivot pins and connection methods may be used to secure the pivot pin 200 to the trigger and the damper mechanism.

While particular embodiments of a powered fastener-driving tool have been described herein, it will be appreciated by those skilled in the art that changes and modifications may be made thereto without departing from the invention in its broader aspects and as set forth in the following claims.

The invention claimed is:

1. A fastener-driving tool damper mechanism for a fastener driving tool operable to drive a fastener in either one of a sequential-actuation mode and a contact-actuation mode, the fastener-driving tool damper mechanism comprising:
- an outer member including:
  - a closed end having a through-hole,
  - an opposing open end, and
  - an elongated protruding tab that extends from an outer surface of the outer member and is configured to be inserted into a groove defined by an actuation lever housing of the fastener driving tool and thereby cause the outer member to move in unison with the actuation lever housing;
- an inner member including an end cap that covers an end of the inner member and that forms a seal with the outer member; and
- a damping fluid in a space between the inner member and the outer members, the damping fluid controlling a rate of movement of the outer member relative to the inner member based on the viscosity of the damping fluid.

2. The fastener-driving tool damper mechanism of claim 1, wherein the space is annular, and a diameter of the inner member is less than an inner diameter of the outer member to form the annular space between the inner member and the outer member.

3. The fastener-driving tool damper mechanism of claim 1, wherein the inner member has a cylindrical shape.

4. The fastener-driving tool damper mechanism of claim 1, which includes a protruding prong extending from the end cap of the inner member and configured to be inserted into a groove formed on an inner surface of a trigger of the fastener driving tool to hold the inner member in position relative to the trigger such that the outer member and actuation lever housing are rotatable relative to the inner member.

5. The fastener-driving tool damper mechanism of claim 1, which includes a pair of protruding prongs extending from the end cap of the inner member and configured to be inserted in a groove formed on an inner surface of a trigger of the fastener driving tool to hold the inner member in position relative to the trigger such that the outer member and actuation lever housing are rotatable relative to the inner member.

6. The fastener-driving tool damper mechanism of claim 1, wherein the damping fluid is a silicone fluid.

7. The fastener-driving tool damper mechanism of claim 1, wherein the damping fluid is injected into the space.

8. The fastener-driving tool damper mechanism of claim 1, which includes a seal formed between the end cap of the inner member and the outer member such that the seal prevents the damping fluid from leaking out of the space.

9. The fastener-driving tool damper mechanism of claim 1, wherein the inner member defines a through-hole configured to receive a pivot pin such that through-holes of side walls of a trigger of the fastener-driving tool are alignable with the through-hole of the inner member and a central through-hole in the actuation lever housing.

10. The fastener-driving tool damper mechanism of claim 1, wherein the rate of movement is a rate of rotation.

11. A fastener-driving tool damper mechanism for a fastener driving tool operable to drive a fastener in either one of a sequential-actuation mode and a contact-actuation mode, the fastener-driving tool damper mechanism comprising:
- an outer member; and
- an inner member, wherein the outer member and the inner member define an annular space between the inner member and the outer member, wherein the annular space is configured to receive one of a damping fluid and a damping gas.

12. The fastener-driving tool damper mechanism of claim 11, which is configured to control a rate of movement of the outer member, and thereby an actuation lever housing of the fastener-driving tool relative to a trigger of the fastener-driving tool.

13. The fastener-driving tool damper mechanism of claim 11, which is configured to control a rate of rotation of the outer member, and thereby an actuation lever housing of the fastener-driving tool relative to a trigger of the fastener-driving tool.

14. The fastener-driving tool damper mechanism of claim 11, wherein an outer diameter of the inner member is less than an inner diameter of the outer member to form the annular space between the inner member and the outer member.

15. The fastener-driving tool damper mechanism of claim 11, wherein the inner member has a cylindrical shape.

16. The fastener-driving tool damper mechanism of claim 11, wherein the damping fluid is a silicone fluid.

17. The fastener-driving tool damper mechanism of claim 11, wherein the damping fluid is injected into the annular space.

18. The fastener-driving tool damper mechanism of claim 11, which includes a seal formed between an end cap of the inner member and the outer member such that the seal prevents the damping fluid from leaking out of the annular space.

* * * * *